United States Patent [19]

Claycomb

[11] 4,359,899
[45] Nov. 23, 1982

[54] WEIGHT ON DRILL BIT MEASURING APPARATUS

[75] Inventor: Jackson R. Claycomb, Houston, Tex.

[73] Assignee: Dresser Industries, Inc., Dallas, Tex.

[21] Appl. No.: 218,317

[22] Filed: Dec. 19, 1980

[51] Int. Cl.³ .............................................. E21B 47/00
[52] U.S. Cl. ................................................... 73/151
[58] Field of Search ............................. 73/151; 175/40

[56] References Cited

U.S. PATENT DOCUMENTS

| 2,869,363 | 1/1959 | Garrison . | |
|---|---|---|---|
| 3,686,942 | 8/1972 | Chatard et al. | 73/151 |
| 3,827,294 | 8/1974 | Anderson . | |
| 3,855,853 | 12/1974 | Claycomb . | |
| 3,855,857 | 12/1974 | Claycomb . | |
| 3,968,473 | 7/1976 | Patton et al. . | |
| 4,120,198 | 10/1978 | Tanguy et al. . | |

Primary Examiner—Jerry W. Myracle
Attorney, Agent, or Firm—Richard M. Byron

[57] ABSTRACT

A measuring device is provided for measuring the weight applied to a drilling bit or like device in a borehole while the drilling is taking place. The measuring apparatus has a tubular housing adapted to be coupled into a drill string preferably immediately above the drill bit. A transducer is mounted in the tubular housing and measures pressure in a captive fluid chamber within the housing which can be correlated to weight on the measuring apparatus and in turn on the drill bit.

20 Claims, 6 Drawing Figures

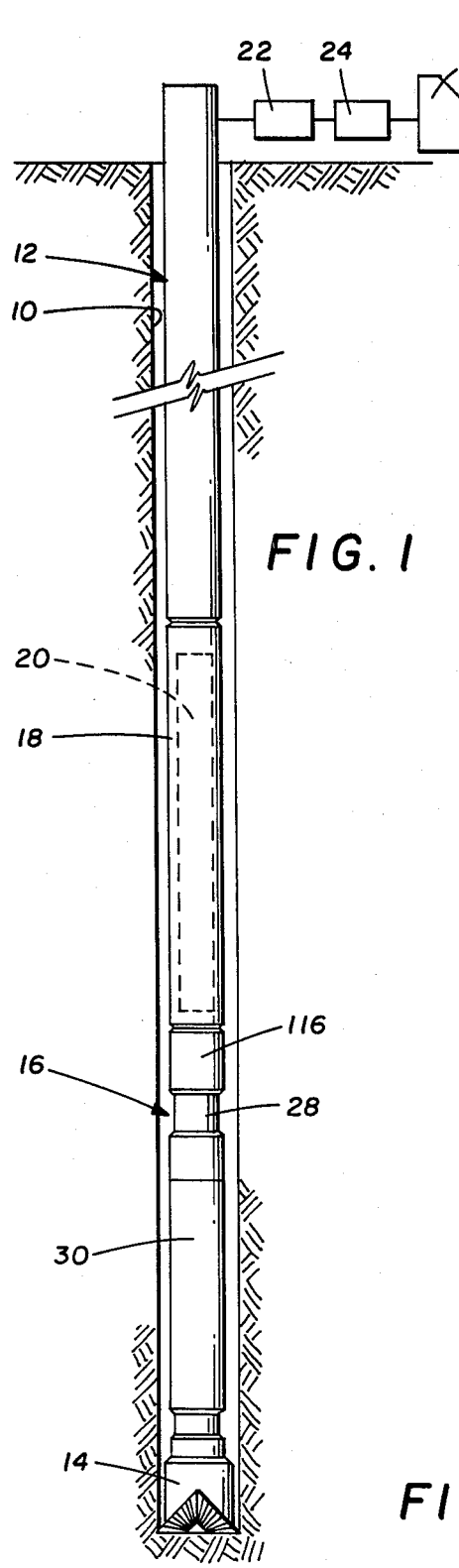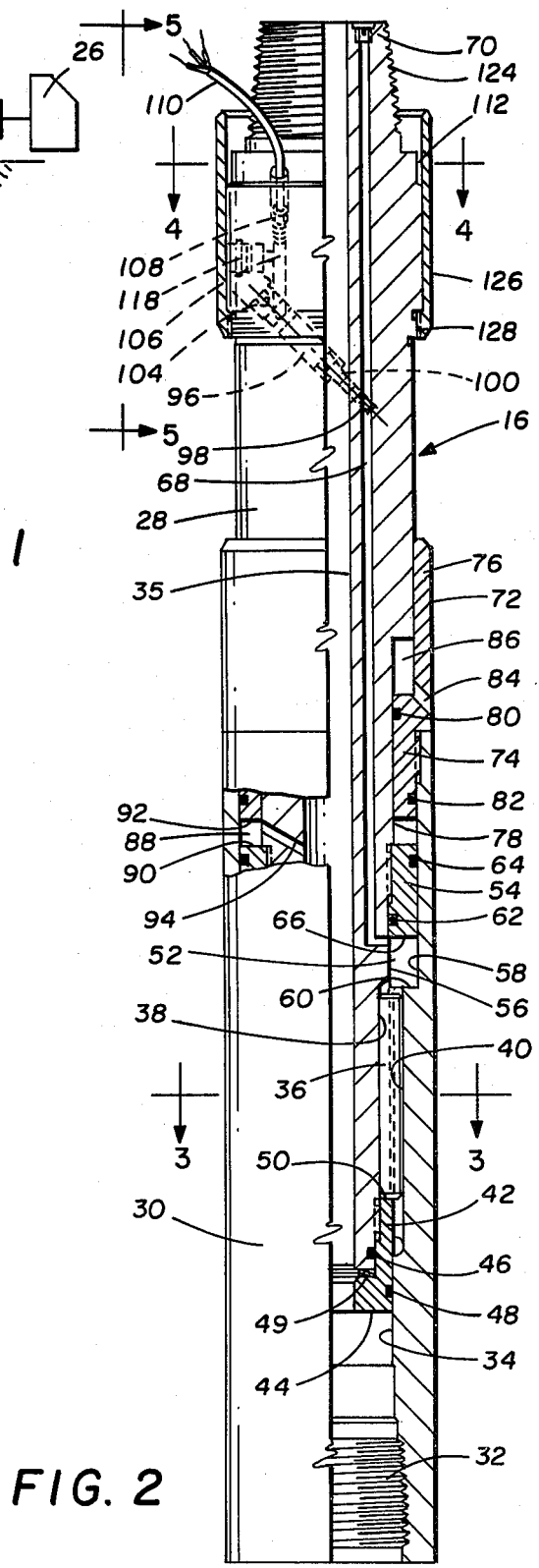
FIG. 1
FIG. 2

WEIGHT ON DRILL BIT MEASURING APPARATUS

TECHNICAL FIELD

This invention is related to logging while drilling systems and more particular to an improved tool for measuring the weight on the drill bit during the drilling operations. Measurements taken by this weight measuring apparatus are communicated to transmitting equipment in the drill string for transmission to receiving equipment at the surface of the earth.

BACKGROUND OF THE INVENTION

Several weight measuring devices are known in the art for the sensing of weight applied to a drill string and particularly to the drill bit for logging while drilling operations. One family of these weight indicating devices utilizes strain gauges mounted on elements within the apparatus that are deformed as a function of the weight applied to the apparatus. These devices suffer from problems associated with the delicate nature of strain gauges and their operation in the rather harsh environment at the bottom of a drill string. These devices which utilize strain gauges are limited due to the physical sensitivity of strain gauges when operating in high temperature environments and other environments where shock and vibration are present. The strain gauges, while noted for their accuracy in determining deformation of materials, are also noted for their delicate nature and exacting requirements regarding installation and operation in order to achieve accurate and meaningful measurements and results. Heretofore such weight measuring devices utilizing strain gauges have been felt to be unsatisfactory because of their delicate nature as well as their subseptibility to error due to exterraneous resistances that may appear in their associated circuitry.

Another family of weight indicating devices utilize a captive fluid chamber within a well tool wherein the weight applied to the tool alters the pressure in the captive fluid chamber and the change in pressure is recorded by a pressure recording instrument contained within and carried by the drill string. Such a device can be utilized only for the recording of weight applied to a drill bit or at some location within a drill string because the recording instrument must be removed from the drill string to analyze the recorded data once the drill string has been removed from the well.

SUMMARY OF THE INVENTION

The drill string weight measuring apparatus of this invention includes a telescopic housing or sub that is pressure balanced to offset the effects of drilling fluid within an internal conduit of the housing and around the exterior of the housing. Within the telescopic housing a captive fluid chamber is arranged so that pressure within this chamber can be measured and correlated to weight or force load applied longitudinally to the housing. A transducer is located within the housing for sensing pressure in the fluid chamber and converting it to an electrical signal for communication to a measurement while drilling apparatus contained elsewhere in the drill string in order to transmit this data to the earth surface.

One object of this invention is to provide a new and improved weight sensing apparatus for measuring the weight applied to the bit of a borehole drill string.

Another object of this invention is to provide an apparatus for measuring the weight applied to a drill bit or like device in a borehole drill string wherein the effects of drilling fluid pressure on the apparatus are eliminated and the true longitudinal force applied to the drill bit and accordingly to the weight measuring apparatus can be determined with a very high accuracy.

Yet another object of this invention is to provide a measuring apparatus to determine the weight applied to the drill bit in a borehole drill string wherein fluid pressure is monitored within a captive fluid chamber within the device and the fluid pressure is relatable to weight applied to the measuring device, and further wherein a pressure transducer within the device is utilized to functionally relate the pressure to an electrical signal that is utilized in transmitting equipment within the drill string to transmit the weight indicative signal to receiving equipment at the earth's surface.

Various other objects, advantages and features of this invention will become apparent to those skilled in the art from the following discussion, taken in conjunction with the accompanying drawings in which:

DESCRIPTION OF THE DRAWINGS

FIG. 1 is a schematic illustration of a borehole having a drill string suspended therein which is equipped for measurement of downhole parameters while drilling and invention;

FIG. 2 is a partially cut away elevation view of the telescopic housing or sub of the weight sensing apparatus with portions thereof shown in dashed lines;

Figure 3:
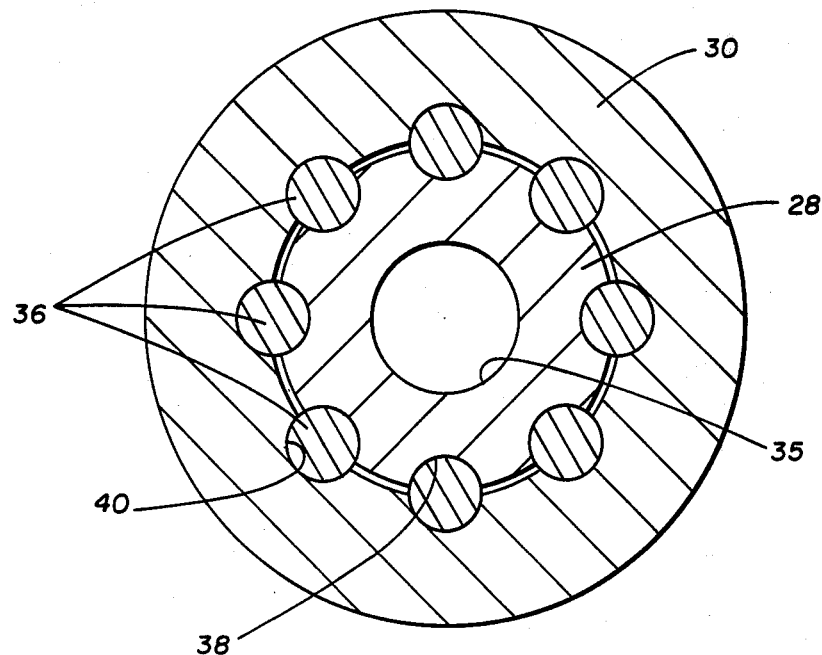
FIG. 3 is a transverse cross sectional view of the weight sensing apparatus taken on line 3—3 of FIG. 2.

The following discussion and the description of the preferred specific embodiment of the weight measuring apparatus of this invention, such description being made with reference to the drawings whereupon the same reference numerals are used to indicate the same or similar parts and/or structure. It is to be understood that such discussion and description is not to unduly limit the scope of the invention.

DETAILED DESCRIPTION OF THE DRAWINGS

Referring to FIG. 1, there is shown a borehole 10 in the earth with a drill string, indicated at 12, suspended therein and having a drill bit 14 attached to its lower end. Immediately above drill bit 14 is the telescopic housing or sub, indicated generally at 16, containing the sensor of the weight measuring apparatus of this invention.

In the following description this telescopic housing will be referred to as a "sensor sub 16" for convenience in description.

Immediately above the sensor sub 16 is a special drill collar 18 containing a transmitter 20 that is electrically connected to a transducer within weight sensor sub 16. Transmitter 20 is operable to transmit the appropriate data to the earth's surface. Support equipment at the earth's surface for this measurement while drilling apparatus includes a receiver 22 to receive data from transmitter 20, and associated decoder and processor indicated at 24 and an associated display device 26 to present the data visually for use by the well drilling personnel and/or record it for use later.

Transmitter 20 is located within special drill collar 18 and functions to impart to the drilling fluid being circulated downwardly through the drill string an acoustical signal that is modulated in accordance with data received from the weight sensor sub 16. This acoustical modulated signal is detected at the surface by receiver 22 and accordingly processed for recording and/or display at the display terminal 26. Although an acoustical data transmission system is described herein, it is to be understood that other types of data transmission systems of course may be utilized for providing transmission of data from weight sensor sub 16 to the earth's surface for recovery by apropriate equipment and use in the drilling operation. Also, while the drill string shown includes a conventional drill bit 14 it is to be understood that this apparatus will obviously function with other drilling devices such as a fluid power drill motor and associated cutting equipment.

Referring to FIG. 2, weight sensor sub 16 is comprised of a telescopic, tubular housing including an upper housing member 28 telescopically mounted with a lower housing member 30. At the lower end of lower housing member 30, the interior thereof has a threaded opening of box 32 for the mounting of a drill bit or other drilling device. The upper portion of lower housing member 30 is adapted to receive and mount lower end portion of upper housing member 28 within its interior. An internal bore 34 in the lower portion of lower housing member 30 is adapted to receive the lower seal assembly on the lower portion of upper housing member 28. Drilling fluid passes through the longitudinal passage or bore 35 of upper housing member 28 and the lower housing member internal bore 34. In order to longitudinally, slidably join the housing members and connect them such that they are rotationally locked together a plurality of dowel pins 36 are mounted within elongated mating grooves 38 and 40 formed within the upper housing member 28 and the lower housing member 30 respectively.

A lower seal assembly is provided on the lower end portion of the upper housing member to seal it within bore 34 of lower housing member 30. This seal assembly includes a lower seal sleeve 42 that is threadedly mounted on the lower end portion of upper housing member 28. Lower seal sleeve 42 has an enlarged lower portion that inwardly overlaps the lower end of upper housing member 28. An annular surface 44 on the lowermost end of lower seal sleeve 42 is exposed to the interior passage of weight sensor sub 16. An O-ring 48 provides a seal between the exterior of lower seal sleeve 42 and the surface of bore 34. An O-ring 46 between the interior of lower seal sleeve 42 and the exterior of the lower end portion of upper housing member 28 provides a seal between these members below the threaded juncture of these members. A resilient lock ring 49 is positioned between the overhanging lower end portion of lower seal sleeve 42 and the lower end of upper housing member 28 for preventing rotation of locking sleeve 42 on the upper housing member. An annular abutment 50 is formed on the upper end portion of lower seal sleeve 42 and will contact the lower ends of dowel pins 36 to limit their downward movement on upper housing member 28.

Above dowel pins 36 there is a captive fluid chamber 52 formed between the housing members and the lower seal assembly and a middle seal assembly thereabove. Captive fluid chamber 52 is designed to be isolated from the pressure effects of the drilling fluid contained within the interior of weight sensor sub 16. Captive fluid chamber 52 is arranged to be variable in its volume depending upon the relative position of the upper and lower housing members. As a result the pressure of fluid contained in captive fluid chamber 52 is likewise variable depending upon the position of these housing members.

The middle seal assembly at the upper end of captive fluid chamber 52 includes a middle seal sleeve 54 that is threadedly mounted around the exterior of a mid portion of upper housing member 28. O-rings 62 and 64 are mounted in respective lower and upper grooves in middle seal sleeve 54 to seal against respective seal surfaces 56 and 58 on the upper and lower housing members 28 and 30. Middle seal sleeve 54 terminates at surface 66 on its lower end. Seal surfaces 56 and 58 can be considered as terminating at radial abutment 60 at its lower end. Below the upper seal assembly captive fluid chamber 52 is defined by the facing sides of housing members 28 and 30 down to the lower seal assembly. Between these seal assemblies fluid fills the voids surrounding dowel pins 36 and between grooves 38 and 40. The length of fluid chamber 52 is between O-ring 64 sealing on surface 58 and O-ring 48 sealing on bore surface 34. The effective area provided by fluid chamber 52, that enters the fluid balance relation, is an annular area between the seal points of O-rings 64 and 48 on their respective seal surfaces 58 and 34.

A fluid passageway 68 is formed longitudinally through upper housing member 28 for fluid communication between fluid chamber 52 and a pressure transducer mounted within upper housing member 28. Passageway 68 includes a transversely disposed segment opening to fluid chamber 52 through upper housing member exterior surface 56. A plug 70 is threadedly mounted in the upper end of passageway 68 to seal it at its upper end within upper housing member 28. A substantially incompressable liquid such as oil or the like can be used to fill fluid chamber 52 and its associated passageways.

An upper seal assembly is provided in a spaced relation above the middle seal assembly in order to form a balancing pressure fluid chamber to assist in offsetting the effects of drilling fluid on the weight sensor sub. An upper seal sleeve 72 is threadedly mounted to the upper end portion of lower housing member 30. This sleeve 72 includes a lower portion 74 within lower housing member 30 and a radially larger diameter upper portion 76 above the upper end of lower housing member 30. Upper seal sleeve lower portion 74 has its inner surface slidably movable along an external seal surface 78 of upper housing member 28. O-rings 80 and 82 of this seal sleeve lower portion 74 provide a fluid seal between surface 78 of upper housing member 28 and surface 58 on the interior of lower housing member 30, respectively. Upper seal sleeve upper portion 76 overlaps a segment of upper housing member 28 that is larger in diameter than seal surface 78 thereby forming a protective covering of the upper portion of seal surface 78. An annular drilling fluid chamber 86 is formed between the upper portion of seal surface 78 and an overlapping portion of upper seal sleeve upper portion 76. A vent port 84 through upper seal sleeve upper portion 76 provides free flowing fluid communication between chamber 86 and the drilling fluid normally located in the annulus around the drill string. Vent port 84 insures that no fluid is trapped within chamber 86 that might hamper the operation of the weight sensing portions of this apparatus.

Pressure balancing fluid chamber 88 is formed between the exterior of upper housing member 28, the interior of lower housing member 30, and between the upper end 90 of middle seal sleeve 54, and the lower end 92 of upper seal sleeve 72. A fluid passageway 94 transversely through upper housing member 28 provides fluid communication between pressure balance fluid chamber 88 and interior passageway 35 of the upper housing member. Drilling fluid may enter pressure balance fluid chamber 88 through passageway 94 and thereby exert fluid pressure simultaneously upon both of the housing members. This fluid pressure acts on surface 90 of middle seal sleeve 54 which is secured to upper housing member 28, and it also acts on surface 92 of upper seal sleeve 72 that is secured to lower housing member 30.

At the upper end portion of the weight sensor sub, a pressure transducer 96 is mounted within the wall of the tubular upper housing member and connected in fluid communication with passageway 68. This pressure transducer 96 is adapted to measure one fluid pressure relative to a reference pressure. In this installation pressure transducer 96 measures fluid pressure in captive fluid chamber 52 relative to fluid pressure in the annulus around the drill string in the vicinity of the weight sensor sub 16. In order to accomplish this a sensing portion of pressure sensor 96 is exposed to fluid pressure equivalent to that in captive fluid chamber 52 while another reference portion of the pressure sensor is exposed to a fluid pressure equivalent to that in the borehole annulus at the weight sensor sub 16. Pressure transducers capable of making such measurements are well known in the art thus specific structural details of this transducer will not be described herein. Pressure transducer 96 is located in a cavity and it is threadedly mounted in a passageway that is communicably connected to captive fluid chamber 52 for the application of the pressure to be sensed to the transducer. The cavity containing transducer 96 is arranged to be maintained at the fluid pressure of the borehole annulus by a hydrostatic pressure compensator described hereinafter.

Figure 4:
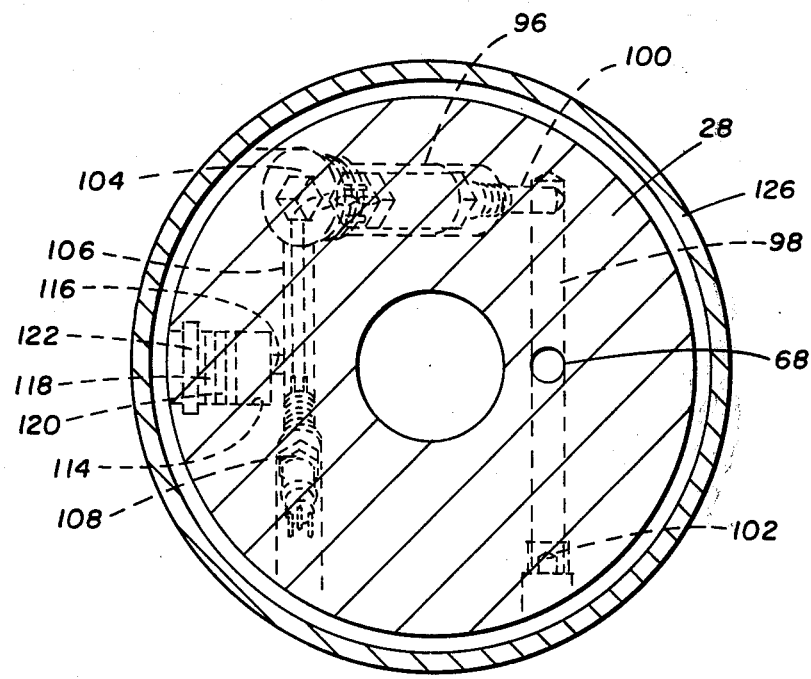
FIG. 4 is a transversely taken cross sectional view of the weight sensing apparatus taken on line 4—4 of FIG. 2.
Figure 5:
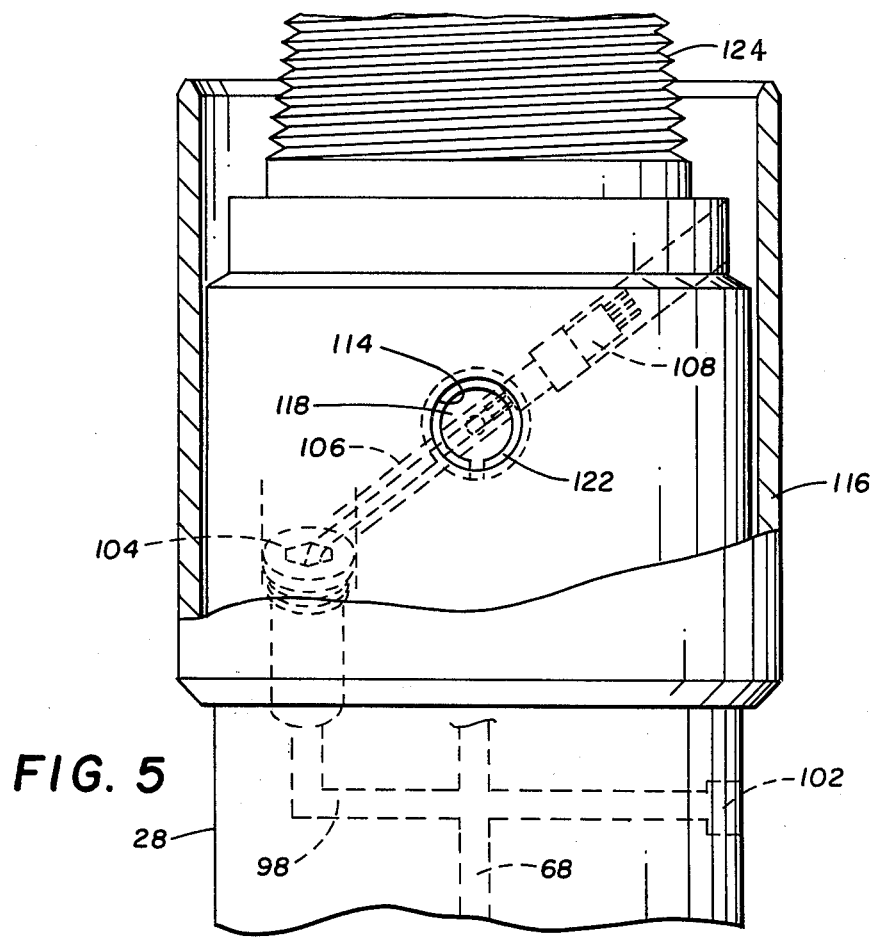
FIG. 5 is an elevation view of the upper portion of the weight sensor sub with a portion of the exterior cut away.

Referring to FIGS. 2 and 4; a first transverse passageway 98 intersects longitudinal passageway 68 and in turn connects with a second transverse passageway 100. The second transverse passageway 100 is angularly oriented within the sidewall of upper housing member 28 and defines a cavity with cavity pressure transducer 96 contained therein. Pressure transducer 96 has a threaded end portion that is threadedly mounted in a sealed configuration with a portion of second transverse passageway 100 in order to operably connect a pressure sensing portion thereof in fluid communication with the connecting passageways 98 and 68 and fluid chamber 52. A plug 102 seals the end of first transverse passageway 98 that is not connected with pressure transducer 96. A plug 104 seals the cavity end of passageway 100 containing pressure transducer 96. A third transverse passageway 106 intersects second transverse passageway 100 at a location between plug 104 and transducer 96. Wires from pressure transducer 96 and a cable connector 108 are mounted within this third transverse passageway. Connector 108 is threadedly and sealedly mounted within third transverse passageway 106 to provide a fluid seal for the passageway and an electrical connection point for an electrical cable 110. Electrical cable 110 is used to connect pressure transducer 96 with transmitter 20 located within transmitter drill collar 18 normally positioned immediately above weight sensor sub 16. The uppermost end of third transverse passage 106 opens to the exterior of upper housing member 28 at a reduced diameter portion 112 on the periphery thereof.

A hydrostatic pressure compensator is provided in the upper end portion of upper housing membr 28 to function with pressure sensor 96 in measurement of fluid pressure in captive fluid chamber 52. This pressure compensator has a piston bore 114 transversely located in the upper end portion of upper housing member 28. Piston bore 114 is connected to third transverse passageway 106 by passageway 116. A piston 118 is movably mounted in piston bore 114. An O-ring 120 around piston 118 seals it in piston bore 114. A lock ring 122 is mounted in a groove within piston bore 114 to limit outward movement of piston 118. The outer side of piston 118 is exposed to borehole annulus pressure and its inner side is effectively exposed to pressure transducer 96. In operation the hydrostatic pressure compensator permits hydrostatic fluid pressure from the borehole annulus to be applied via piston 118 to the fluid in third transverse passageway 116 and in turn to be applied to the pressure reference portion of pressure transducer 96. In order for fluid pressure to be applied by this pressure compensator third transverse passageway 106 and the cavity containing pressure transducer 96 are filled with a substantially incompressable liquid such as oil or the like. In operation this pressure compensators piston 118 will float in piston bore 114 and function to substantially unrestrictedly transfer fluid pressure from the borehole annulus to pressure sensor 96.

The upper end portion of upper housing member 28 has a threaded pin 124 for connecting the weight sensor sub to the drill string. A protective sleeve 126 is removably threadedly mounted around the upper end portion of upper housing member 28. Protective sleeve 126 extends over the end portion of the housing member that contains the hydrostatic pressure compensator, the second passage plug 104, and the outlet of third transverse passageway 106 and also over a portion of threaded pin 124. Protective sleeve 126 fits loosely around the upper end portion of upper housing member 28 in order for drilling fluid in the borehole annulus to have access to the hydrostatic pressure compensator. The lower portion of protective sleeve 126 is provided with internal threads to mate with corresponding external threads on upper housing member 28 so that a threaded joint 128 is formed to secure protective sleeve 126 to upper housing member 28 when the weight sensor sub is nstalled in the drill string. Protective sleeve 126 can be unthreaded at joint 128 and slid downward on upper housing member 28 for installation in the drill string and connection of electrical cable 110. Once the sub is connected in the drill string protective sleeve 126 is then moved upward and secured at threaded joint 128 to protect the electrical connection between weight sensor sub and special transmitter drill collar 18.

Pressure balancing of the upper and lower housing members of this weight sensor sub is done to remove from the weight measuring system the effects of drilling fluid within the drill string and the drilling fluid around the sub in the annulus between the drill string and the borehole. The buoyancy effect of the drill string is not a factor in determining the weight applied to the drill bit when using the weight measuring apparatus of this invention because it measures the force or longitudinally disposed load in the drill string at the location of the weight sensor sub. One force entering into consideration of the weight applied to the drill bit is the force created by the high pressure drilling fluid or mud entering pressure balance fluid chamber 88 through passageway 94 from the sub's longitudinal internal passageway 35. Fluid pressure within pressure balance fluid chamber 88 acts between the interior of lower housing member 30 and the exterior of upper housing member 28 over areas which are substantially equal to the annular areas of surfaces 90 and 92 on middle seal sleeve 54 and upper seal sleeve 72 respectively. For the purposes of this discussion, the areas of annular surfaces 90 and 92 are considered to be substantially equal and designated by an area A1. The effect of the relatively high pressure drilling fluid in pressure balance fluid chamber 88 is to tend to telescopically shorten the length of weight sensor sub 16.

In the lower portion of the sub the relatively high pressure drilling fluid in longitudinal passageway 35 acts across the lower end of upper housing member 28. The area upon which this pressure acts extends across interior bore 34 of upper housing member 28. For purposes of this discussion this area is designated as area A2. Considering only the high pressure drilling fluid acting on area A2 there is a tendency to telescopically extend weight sensor sub 16.

The third pressure related portion of the weight sensor sub is fluid pressure within captive fluid chamber 52. Drill string weight applied to upper housing member 28 is transferred to lower housing member 30 by the fluid contained within fluid chamber 52 due to the variable volume nature of this chamber in the particular telescopically arranged structure described above. Where the fluid in fluid chamber 52 is substantially incompressible, like oil, then the force transfer is substantially undiminished by the fluid connection. Concerning the transfer of longitudinal forces within the weight sensor sub, the fluid pressure within captive fluid chamber 52 acts over an area A3. Area A3 is the annular area between seal surface 58 inside lower housing member 30 below the middle seal assembly and bore 34 in the lower end of housing member 30. This area can also be thought of as being between the moving seal points of O-rings 64 and 48. The pressure of fluid within captive fluid chamber 52 varies in relation to the longitudinal force applied to the weight sensor sub and it is this pressure that is measured by pressure transducer 96.

With the drill string in an operating condition drilling fluid is pumped down through the drill pipe at a relatively high working pressure whereupon this drilling fluid exits the drill bit and enters the borehole annulus at a relatively lower hydrostatic pressure. In this environment the weight sensor sub is subjected to different operating pressures that must be accounted for in order to measure weight actually applied to the drilling bit. In order to do this the interior of weight sensor sub 16 is designed to be pressure balanced with respect to the internal and external pressures so the separate housing members (28 and 30) will not be displaced to their mechanical limits of motion by either the drill string working pressure or the borehole annulus hydrostatic pressure. This pressure balancing is accomplished by applying fluid at the working pressure to pressure balance chamber 88 between the housing members (28 and 30). The housing members (28 and 30) are designed such that areas A1 and A2 are operably equivalent so the described effects of pressure are balanced. With these pressure effects being offset then longitudinal force or weight that is applied to upper housing member 28 will be transmitted to lower housing member 30 through the fluid contained in captive fluid chamber 52.

The fluid contained in captive fluid chamber 52 is subjected to forces due to weight applied to the weight sensor sub and also the the borehole annulus hydrostatic pressure. Borehole hydrostatic pressure is applied to the fluid in captive fluid chamber 52 through the hydrostatic pressure compensator and pressure transducer 96. Because pressure transducer 96 measures only relative or differential pressure applied to it the effect of the borehole hydrostatic pressure is offset and it measures the pressure of fluid in captive fluid chamber 52 directly.

Calculating the weight applied to the drill bit can be done by the following equation:

$$W = P3 \, A3$$

where:
W = weight applied through the drill string to the weight sensor sub 16;
P3 = fluid pressure in captive fluid chamber 52; and
A3 = the annular area of captive fluid chamber 52 between seal surface 58 and bore 34.

Because A3 can be calculated from measurements of the weight sensor sub 16 and remain substantially a constant value it is a relatively uncomplicated procedure to monitor P3 and calculate the weight W when desired.

In utilization of this apparatus with an associated apparatus for making measurements while drilling it would naturally require sequencing with other measuring instruments so that some electrical signals from the instrument package and transmitter 20 can periodically interrogate pressure transducer 96 to obtain data related to the pressure sensed and accordingly the fluid pressure within captive fluid chamber 52. This data is in turn communicated by the transmitter to data receiver 22 at the earth's surface whereupon it is decoded, processed and accordingly presented for display and/or recording and utilization by the drilling crew at display device 26.

In the foregoing it will be recognized that a new and improved apparatus has been provided for sensing the weight applied to a drilling bit which is compatible with a system for making measurements within a borehole while drilling. The sensor apparatus is structurally simple, has a minimal number of components and can easily be manufactured. The weight sensor sub is easily connected into a drill string below a drill collar containing an appropriate transmitter and instrument package and can be integrated into the use thereof to determine the weight or longitudinal force in the drill string at the location of the weight sensor sub. Due to the simplicity of this weight sensor apparatus, it will reliably perform in the notably hostile environment in which it must operate.

Figure 6:
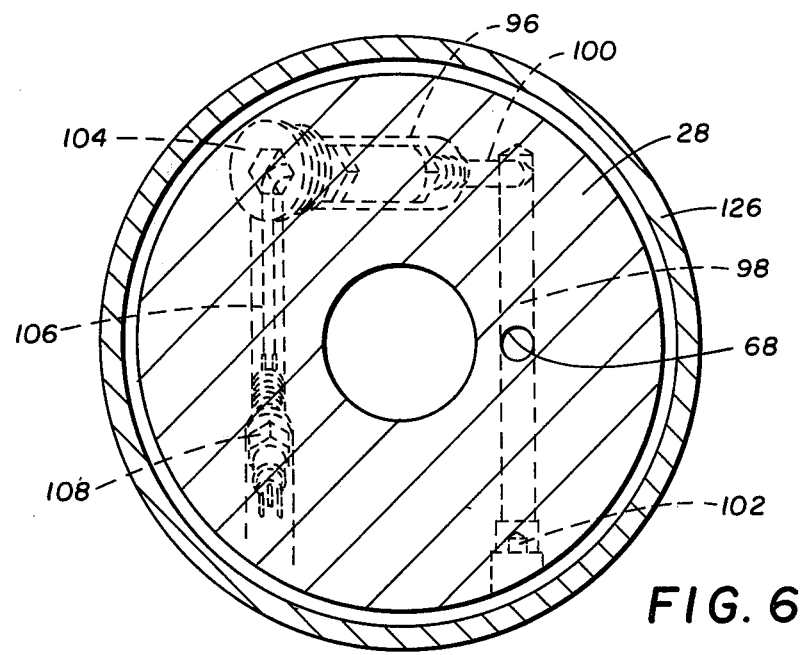
FIG. 6 is a cross sectional view of an alternate embodiment of the pressure transducer arrangement of the weight sensor sub having a predetermined pressure reference.

One modification that can be made to the pressure sensing portion of this weight sensor sub 16 is to make the pressure measurement relative to a predetermined constant as shown in FIG. 6. In order to do this the hydrostatic pressure compensator is not used and the cavity in which the pressure transducer 96 is mounted is sealed from the borehole annulus fluid by plug 104 and connector 108. Also pressure transducer 96 is provided with a predetermined reference pressure that must be accounted for in computation of the pressure P3 within captive fluid chamber 52. Provided that this predetermined reference pressure is a positive pressure it will be subtracted from the measured pressure of the transducer to determine the actual pressure P3 needed for determining the weight on drilling bit 14. In using such a pressure transducer arrangement the predetermined pressure can be atmospheric pressure or some other determinable pressure selected at the convenience of the designer.

Since certain changes or modifications may be made in the disclosed embodiment without departing from the inventive concepts involved, it is the aid of the appended claims to cover all such changes and modifications falling within the true spirit and scope of the present invention.

The embodiments of the invention in which an exclusive property or privilege is claimed are defined as follows:

1. A weight measuring apparatus adapted for measuring the weight load condition in a drilling string while drilling a borehole, comprising:
   (a) tubular housing means adapted to be coupled in a borehole drill string and having upper and lower tubular telescopic housing members arranged for limited relative telescopic movement, wherein said tubular housing means has a pressure balancing means between said upper and lower telescopic housing members to offset the effects of relatively high pressure drilling fluid in said housing means that tends to displace said telescopic members apart and the effect of drilling fluid on the exterior of said housing means that tends to displace said telescopic members together;
   (b) means between said telescopic upper and said lower housing to sense the longitudinal force load on said housing means including a variable volume fluid chamber situated between said upper and lower housing members and arranged such that the pressure of fluid in said chamber is functionally related to the longitudinal force load on said tubular housing means; and
   (c) said means to sense also includes a fluid pressure transducer in one of the housing members and in fluid communication with said chamber to sense fluid pressure in said chamber, said fluid pressure transducer being operably connected to a means of transmitting measured data in order to relay this data to drilling equipment at the earth's surface.

2. The weight sensing apparatus of claim 1, wherein said volume variable fluid chamber is defined between facing surfaces of said upper and lower telescopic housing members and between two spaced apart seal assemblies operably mounted between said upper and lower telescopic housing members such that longitudinal movement of said housing members will vary the volume of said fluid chamber and such that fluid is retained captive in said chamber.

3. The weight measuring apparatus of claim 1, wherein said transducer is adapted to measure fluid pressure in said volume variable fluid chamber relative to a predetermined pressure.

4. The weight measuring apparatus of claim 3, wherein said reference pressure is substantially atmospheric pressure.

5. The weight measuring apparatus of claim 1, wherein said transducer is adapted to measure fluid pressure in said variable volume chamber relative to fluid pressure in the annulus between the associated drill string and the borehole in a zone immediately adjacent to said weight measuring apparatus.

6. The weight measuring apparatus of claim 1, wherein:
   (a) said one of said telescopic members having said pressure transducer has an opening at at peripheral end portion thereof adjacent to a threaded portion for coupling said weight measuring apparatus into a drill string, said opening adapted for the passage of electrical wires from said pressure transducer; and
   (b) said one of said telescopic housing members has a sleeve mounted therearound and positionable in rigid relation to said housing member for covering a portion of said threaded end portion of an associated threaded element on a drill string in order to protect the electrical wires from physical damage in the downhole borehole drilling environment.

7. The weight measuring apparatus of claim 1, wherein said means to sense has a means to sense fluid pressure in a borehole annulus around said tubular housing means and associated means to compensate pressure measurements of said means to sense for fluid pressure in the borehole annulus.

8. The weight measuring apparatus of claim 7, wherein said means to sense fluid pressure in a borehole annulus has a cavity containing said pressure transducer wherein said cavity is maintained at generally the fluid pressure of a borehole annulus when said weight measuring apparatus is in operation.

9. A weight sensing apparatus for sensing the weight load condition on a drilling string while drilling a borehole, comprising:
   (a) tubular housing means adapted to be coupled into a borehole string and having an upper housing member coupleable to a drill string and telescopically mounted within a lower housing member that is coupled with a borehole drilling device such as a bit, said upper housing member and said lower housing member having means therewith to balance the effect of internal drilling fluid pressure that tends to telescopically extend said housing members and the effect of external drilling fluid pressure that tends to telescopically retract said housing members, and said housing members also defining a fluid pressure measuring captive fluid chamber therebetween that is fluidicly isolated from said drilling fluid, wherein said captive fluid chamber is pressurized in relation to longitudinal compressive forces applied to said tubular housing means; and
   (b) means within said tubular housing means to sense pressure in said captive fluid chamber and thereby sense a measurable parameter indicative of longitudinal force applied to said weight measuring apparatus which is indicative of weight placed on said drilling device.

10. The weight measuring apparatus of claim 9, wherein said means to balance includes an area on a lower portion of said upper housing member exposed to relatively high pressure drilling fluid from the interior of said tubing string; another area on an upper portion of said lower housing member exposed to relatively low pressure drilling fluid from the annulus between said drill string and a borehole; and other areas on an upwardly facing surface of said upper housing member and on a downwardly facing surface of said lower housing member that are exposed to relatively high pressure drilling fluid from the interior of said drill string.

11. The weight measuring apparatus of claim 10, wherein said means to sense pressure includes a pressure transducer mounted in an upper end portion of said upper housing member and adapted to sense fluid pressure in said captive fluid chamber and transform that senses measurement into an electrically perceptible signal indicative of weight on said drilling device.

12. The weight measuring apparatus of claim 11, wherein:
(a) said upper housing means has a threaded end portion for coupling same into a drill string and a sleeve removably mounted around and on said threaded end portion and overlap a threaded end portion of the mating drill string,
(b) said means to sense pressure has a passage through said upper housing means from said transducer to an outlet at said upper housing means threaded end portion and overlapped by said upper housing means threaded end portion and overlapped by said sleeve when positioned to overlap a portion of said threaded end portion; and
(c) said transducer having an electrical cable extending therefrom through said passage for connection to a transmitter apparatus located in said drilling string for transmitting data from said pressure transducer to a receiver apparatus at the earth's surface.

13. The weight measuring apparatus of claim 12, wherein said means to sense pressure has means to sense fluid pressure in said captive fluid chamber independent of fluid pressure in a borehole containing the weight measuring apparatus.

14. The weight measuring apparatus of claim 12, wherein said means to sense fluid pressure in said captive fluid chamber relative to a predetermined reference pressure.

15. The weight measuring apparatus of claim 9, wherein said tubular housing means has:
(a) a lower seal means between said lower housing means and said upper housing means at a lower portion of said lower housing means, a middle seal means between said lower housing means and said upper housing means above said captive fluid chamber, an upper seal means also between said lower and upper housing means spaced above said middle seal means; and
(b) said means to balance has relatively high pressure drilling fluid applied to said upper housing member across said lower seal means and to both of said housing members between said middle seal means and said upper seal means and relatively low pressure drilling fluid applied to said lower housing member above said upper seal means.

16. A weight measuring apparatus adapted for measuring the weight load condition in a drilling string while drilling a borehole, comprising:
(a) a drill string operably positioned in a borehole for the drilling thereof,
(b) transmitting and data processing apparatus contained within at least one drill collar of said drill string operable to sense various drilling related measurement data and transmit some data to the earth's surface,
(c) drilling data receiving means at the earth's surface operable for receiving and processing said various drilling related measurement data for display to individuals operating the drilling operation and for recording of some data,
(d) tubular housing means adapted to be coupled in a borehole drill string and having upper and lower tubular telescopic housing members arranged for limited relative telescopic movement, a pressure balancing means between said upper and lower telescopic housing members to offset the effects of relatively high pressure drilling fluid in said housing means that tends to displace said telescopic members apart and the effect of drilling fluid on the exterior of said housing means that tends to displace said telescopic members together;
(e) means between said telescopic upper and said lower housing to sense the longitudinal force load on said housing means including a variable volume fluid chamber situated between said upper and lower housing members and arranged such that the pressure of fluid in said variable volume fluid chamber is functionally related to the longitudinal force load on said tubular housing means; and
(f) said means to sense also includes a fluid pressure transducer in one of the housing members and in fluid communication with said chamber to sense fluid pressure in said chamber, said fluid pressure transducer being operably connected to a means of transmitting measured data in order to relay this data to drilling equipment equipment at the earth's surface in order for this pressure measurement to be used in calculating the weight load condition in the drill string at said tubular housing means.

17. A method of measuring the weight applied a drill bit in a borehole drill string while drilling in a borehole, comprising the steps of:
(a) operably connecting a pressure balanced weight sensor sub in a drill string wherein said sub has upper and lower telescopic housing members with a variable volume captive fluid chamber therebetween arranged such that fluid pressure therein is related to longitudinal force load on said weight sensor sub wherein this fluid pressure is sensed by a pressure transducer and wherein fluid pressures inside of and outside of said sub are balanced relative to said variable volume captive fluid chamber;
(b) operably connecting said pressure transducer to a data transmitting means in said drill string operable to transmit data upward to the earth surface while drilling;
(c) drilling a borehole with said drill string;
(d) sensing of the fluid pressure in a said captive fluid chamber with said pressure transducer and creating an electrical data signal indicative of the pressure;
(e) conveying the electrical pressure data signal to said transmitting means;
(f) transmitting a signal indicative of said pressure data signal from said transmitting means in said drill string to a receiving means at the earth surface,
(g) determining the longitudinal force applied to said drill bit by correlating the pressure data signal received by said receiving means with a known pressure parameter for said weight sensor sub.

18. The method of claim 17, wherein said step of determining the longitudinal force applied to said drill bit the step of determining the longitudinal force applied to said drill bit based on said pressure data signal representing fluid pressure acting on a pressure affected area within the weight sensor sub.

19. The method of claim 17, wherein said sensing of the fluid pressure in said captive fluid chamber is done independent of fluid pressure within the drill string and in the annulus around said drill string in the borehole.

20. The method of claim 17, wherein said sensing of the fluid pressure in said captive fluid chamber is done relative to a predetermined reference pressure.

* * * * *